(12) United States Patent
Huang et al.

(10) Patent No.: US 8,813,626 B2
(45) Date of Patent: Aug. 26, 2014

(54) 3D BRAIDED COMPOSITED TUBES WITH THROAT SECTIONS AND MANUFACTURE METHOD THEREOF

(71) Applicants: Mau-Yi Huang, Longtan Township, Taoyuan County (TW); Shyh-Jang Sun, Longtan Township, Taoyuan County (TW); Dar-Ping Juag, Longtan Township, Taoyuan County (TW); Pai-Lu Wang, Longtan Township, Taoyuan County (TW); Cheng-Huan Wang, Longtan Township, Taoyuan County (TW)

(72) Inventors: Mau-Yi Huang, Longtan Township, Taoyuan County (TW); Shyh-Jang Sun, Longtan Township, Taoyuan County (TW); Dar-Ping Juag, Longtan Township, Taoyuan County (TW); Pai-Lu Wang, Longtan Township, Taoyuan County (TW); Cheng-Huan Wang, Longtan Township, Taoyuan County (TW)

(73) Assignee: Chung Shan Institute of Science and Technology, Armaments Bureau, M. N. D, Taoyuan County (TW)

(*) Notice: Subject to any disclaimer, the term of this patent is extended or adjusted under 35 U.S.C. 154(b) by 81 days.

(21) Appl. No.: 13/680,449

(22) Filed: Nov. 19, 2012

(65) Prior Publication Data
US 2014/0137722 A1    May 22, 2014

(51) Int. Cl.
*D04C 3/48* (2006.01)
*D04C 1/00* (2006.01)
*B32B 37/02* (2006.01)

(52) U.S. Cl.
CPC . *D04C 1/00* (2013.01); *B32B 37/02* (2013.01); *D04C 3/48* (2013.01)
USPC ............................................................ 87/34

(58) Field of Classification Search
USPC .......................... 87/34; 57/210, 232; 428/377
See application file for complete search history.

(56) References Cited

U.S. PATENT DOCUMENTS

| | | | | |
|---|---|---|---|---|
| 3,583,275 A * | 6/1971 | Duflos | | 87/57 |
| 4,304,169 A * | 12/1981 | Cimprich et al. | | 87/29 |
| 5,979,288 A * | 11/1999 | Gallagher et al. | | 87/36 |
| 6,526,859 B1 * | 3/2003 | Ozawa et al. | | 87/35 |
| 8,006,601 B2 * | 8/2011 | Inazawa et al. | | 87/1 |
| 8,122,809 B2 * | 2/2012 | Simpson | | 87/11 |
| 8,490,530 B2 * | 7/2013 | Kang et al. | | 87/23 |
| 8,616,111 B2 * | 12/2013 | Simpson | | 87/11 |
| 2009/0317636 A1 * | 12/2009 | Filsinger et al. | | 428/377 |
| 2010/0010438 A1 * | 1/2010 | Simpson | | 604/96.01 |
| 2010/0052203 A1 * | 3/2010 | Inazawa et al. | | 264/103 |
| 2010/0083815 A1 * | 4/2010 | Inazawa et al. | | 87/1 |
| 2012/0221038 A1 * | 8/2012 | Simpson | | 606/192 |

* cited by examiner

*Primary Examiner* — Shaun R Hurley
(74) *Attorney, Agent, or Firm* — Chun-Ming Shih

(57) ABSTRACT

A manufacture method of a three dimensional (3D) braided composite tube with a throat section includes: providing an assembled mandrel comprising an upper mandrel and a lower mandrel, and braiding an 3D braided inner layer on the upper mandrel; winding fiber yarns to form a fiber yarn layer over the 3D braided inner layer; tightening the 3D braided inner layer to the assembled mandrel by an appropriate tension force when winding; and infiltrating resin and increasing temperature to cure the resin for obtaining a composite tube with a narrower throat section. The present invention takes advantage of winding fiber yarn outer layer to keep the radius of the throat of the 3D braided inner layer to meet design requirement. Additionally, the hoop strength of the throat section is increased so that the metal shell can be made thinner to reduce the weight of the rocket nozzle.

5 Claims, 8 Drawing Sheets

3D BRAIDED COMPOSITED TUBES WITH THROAT SECTIONS AND MANUFACTURE METHOD THEREOF

BACKGROUND OF THE INVENTION

1. Field of the Invention

The present invention relates to a three dimensional (3D) braided composite tube, and more particularly, to a 3D braided composite tube with a narrower throat section and a manufacture method thereof.

2. Description of the Related Art

Braiding technologies are widely applied to the manufacture of fabrics, in which fiber yarns are interlaced woven in plane form. Braiding technologies also apply to the composite material and are widely used in many fields, such as vehicle, aviation, navigation, medical treatment, etc.

The composite material manufactured by lamination of fabrics is generally called two dimensional (2D) composite materials, in which the fabrics are used as reinforcement. The main drawback of the laminated 2D composite material is poor interlaminar properties. As an example, the insulation of a rocket nozzle is used in a high temperature (over 2000° C.) and shear force environment caused by hot air flow. Under such severe environment the laminated composite insulation would suffer pre-mature ply lift and/or spallation if the ply angle was not properly designed to avoid being parallel or vertical to air flow.

By adding thru-the-thickness reinforcement, the three dimensional (3D) woven composite material demonstrate much higher interlaminar strength over 2D woven composite material. However, most 3D technologies sacrifice the in-plane properties because of the reduction of the thru-the-thickness fiber content.

Therefore, the 3D braiding technology is introduced to improve interlaminar strength without sacrificing the in-plane properties of the composite structure. The fiber content of the 3D braided composite material is higher than that of the general 3D technologies, so the in-plane property is maintained. However, there are difficulties to manufacture hollow structures with a narrower throat section for used in, for example, a rocket nozzle by 3D braiding technologies.

FIG. 1 illustrates cross-section of a conventional rocket nozzle 100. For clearly showing the direction of the rocket nozzle 100, it also shows the rocket motor 110 in FIG. 1. The rocket nozzle 100 includes a convergent section 120, a throat section 130 and a divergent section 140, and the rocket nozzle 100 is basically a tube having larger radius at each end than the middle. The inner layer of the rocket nozzle 100 is an insulated layer 150 that reduces the heat via ablation to protect the shell 160.

FIG. 2 illustrates that the insulated layer 150 is manufactured on a mandrel 200 by a 3D braiding technology. Tension of fiber yarn 210 in the insulated layer 150 prevents it from contacting the mandrel 200 while braiding. The convergent section 220, the throat section 230 and the divergent section 240 of mandrel 200 are respectively correspond to the convergent section 120, the throat section 130 and the divergent section 140 of FIG. 1. The fiber yarn 210 in the insulated layer 150 being not able to contact to mandrel 200 make the radius of the throat section larger than desired, as a result, the propulsion of the rocket nozzle is reduced.

There thus exists a need and a demand for an improvement in the methods for making a 3D braided composite tube with a narrower throat section to overcome the difficulty in prior art.

SUMMARY OF THE INVENTION

In view of the foregoing, it is an object of the present invention to provide a 3D braided composite tube with a throat section and a manufacture method thereof.

For achieving the object above, a 3D braided composite tube with a throat section is disclosed according to one embodiment of the present invention. The step of the manufacture method comprises: providing an assembled mandrel comprising an upper mandrel and a lower mandrel; separating the lower mandrel from the upper mandrel and braiding an 3D braided inner layer on the upper mandrel, then tightening the 3D braided inner layer to the upper mandrel at the upper larger radius portion and the throat portion by binding devices; combining the lower mandrel with the upper mandrel and fixing the lower mandrel to the upper mandrel by a fixing device, then tightening the 3D braided inner layer to the lower mandrel by another set of binding devices; removing the binding devices, followed by winding fiber yarns over the inner layer from the middle portion of the assembled mandrel toward two ends thereof to the binding devices at ends for forming a fiber yarn outer layer over the 3D braided inner layer; and infiltrating resin into the 3D braided inner layer and the fiber yarn outer layer, followed by increasing temperature to cure the resin for obtaining a composite tube.

BRIEF DESCRIPTION OF THE DRAWINGS

The invention, as well as its many advantages, may be further understood by the following detailed description and drawings in which.

DETAILED DESCRIPTION OF THE INVENTION

Reference will now be made to the drawings to describe exemplary embodiments of the present 3D braided composite tube and manufacture method thereof in detail. The following description is given by way of example, and not limitation.

Figure 3:
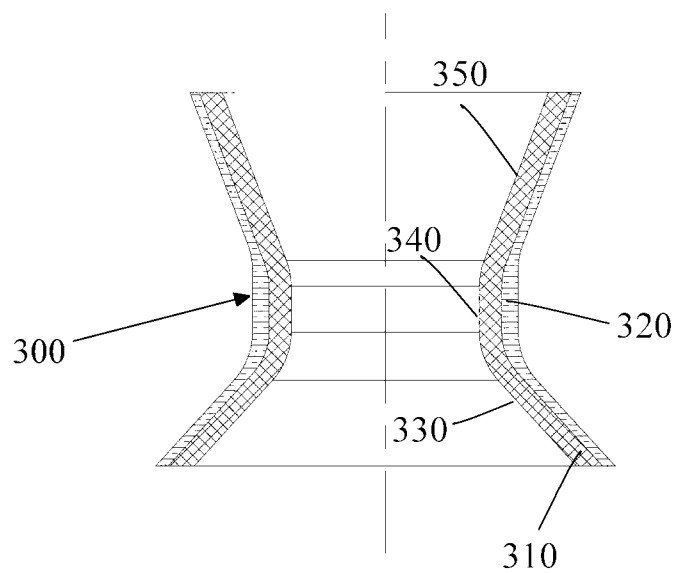
FIG. 3 schematically illustrates cross-section diagram of the 3D braided composite tube of the present invention.
Figure 4:
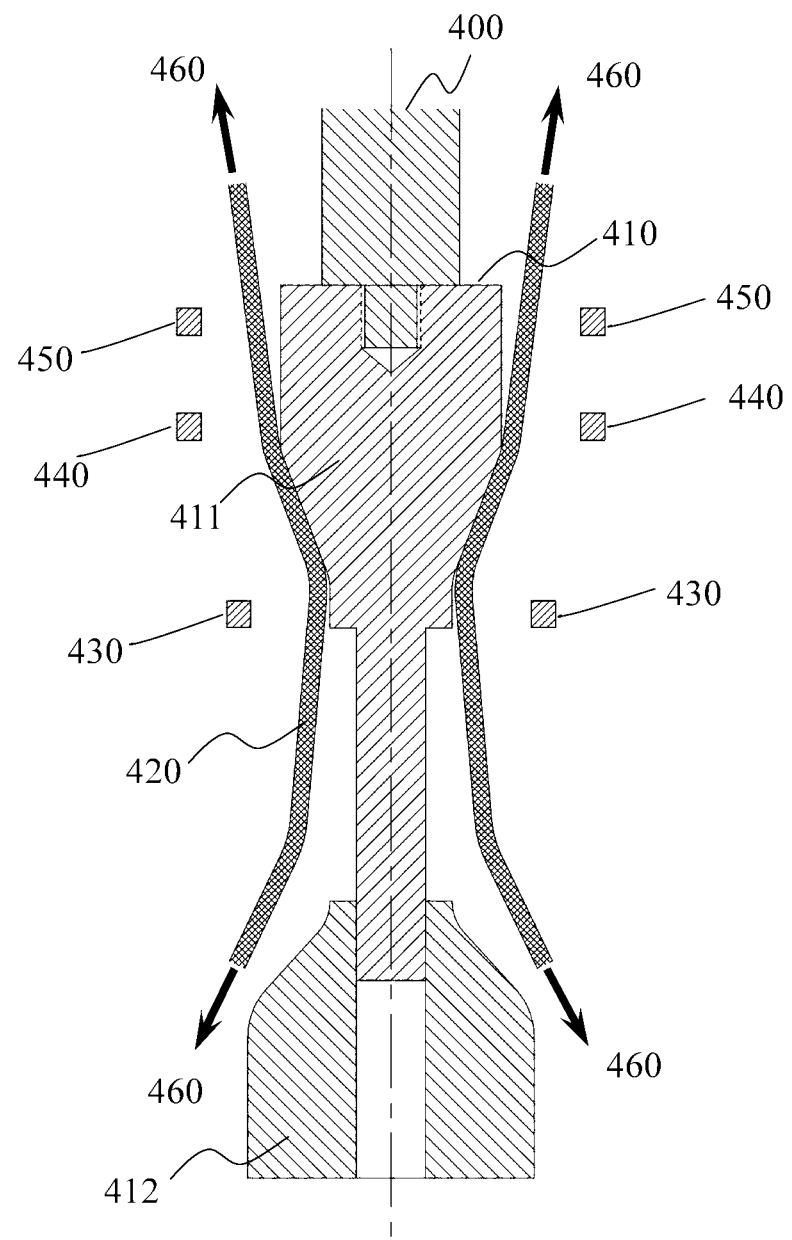
FIG. 4 schematically shows the first step (Step 1) of the manufacture method of the present invention.
Figure 5:
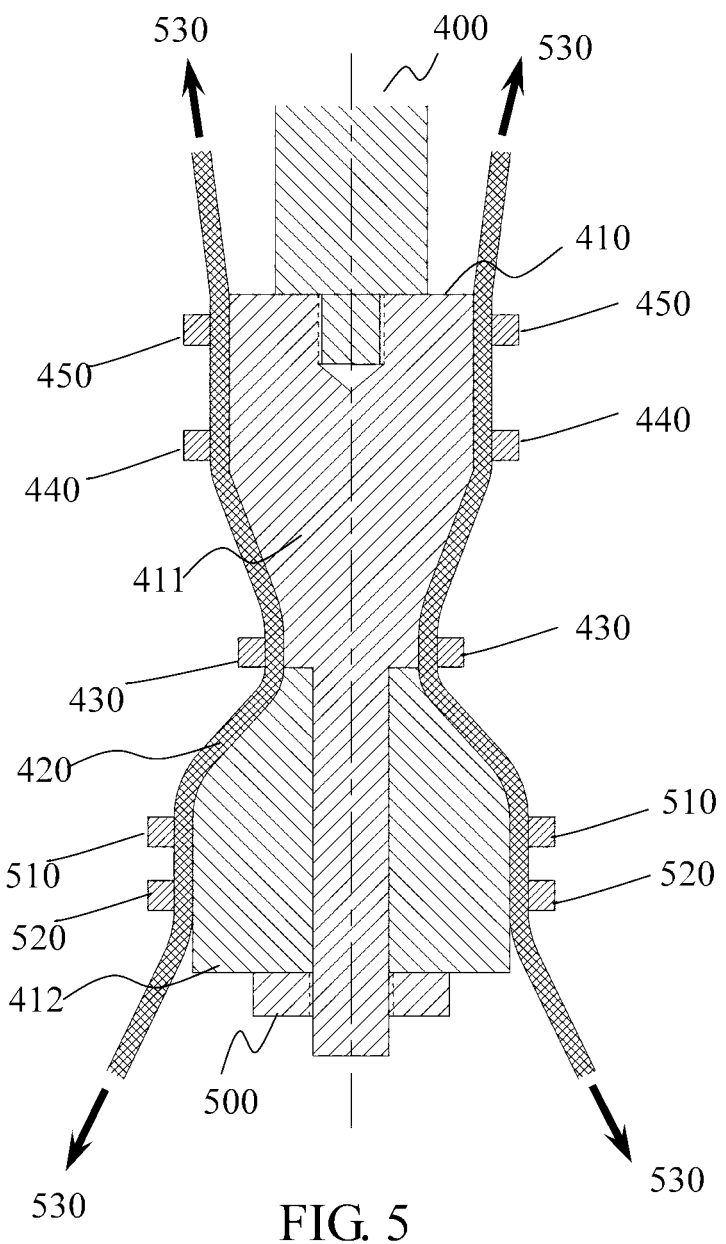
FIG. 5 schematically shows the second step (Step 2) of the manufacture method of the present invention.
Figure 6:
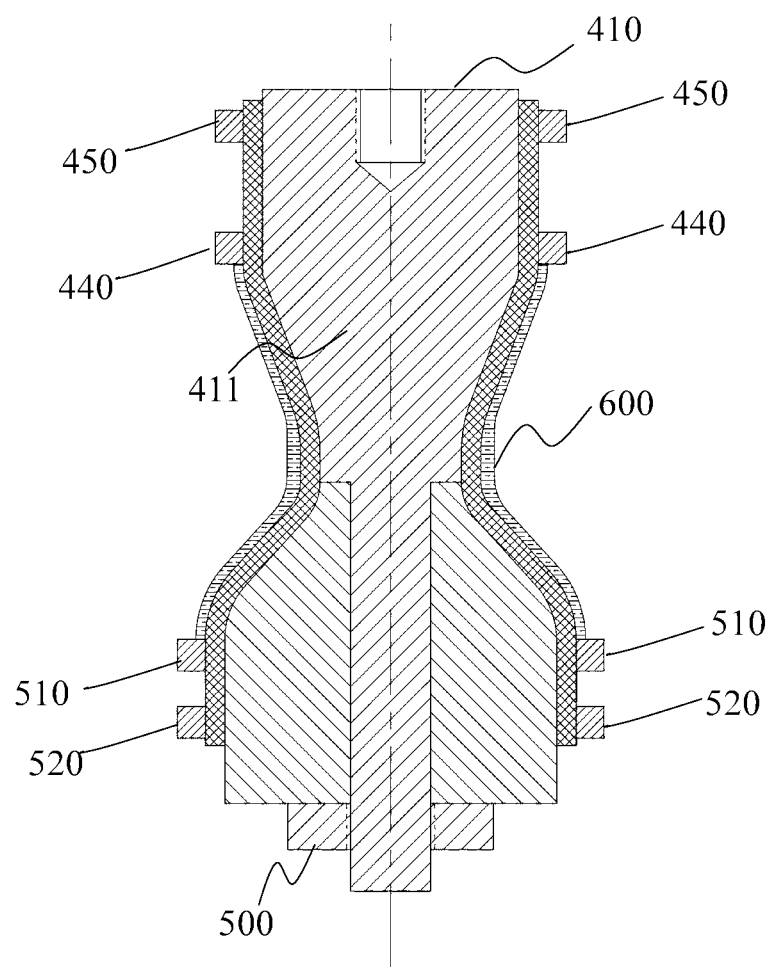
FIGS. 6-7 schematically show the third step (Step 3) of the manufacture method of the present invention.
Figure 7:
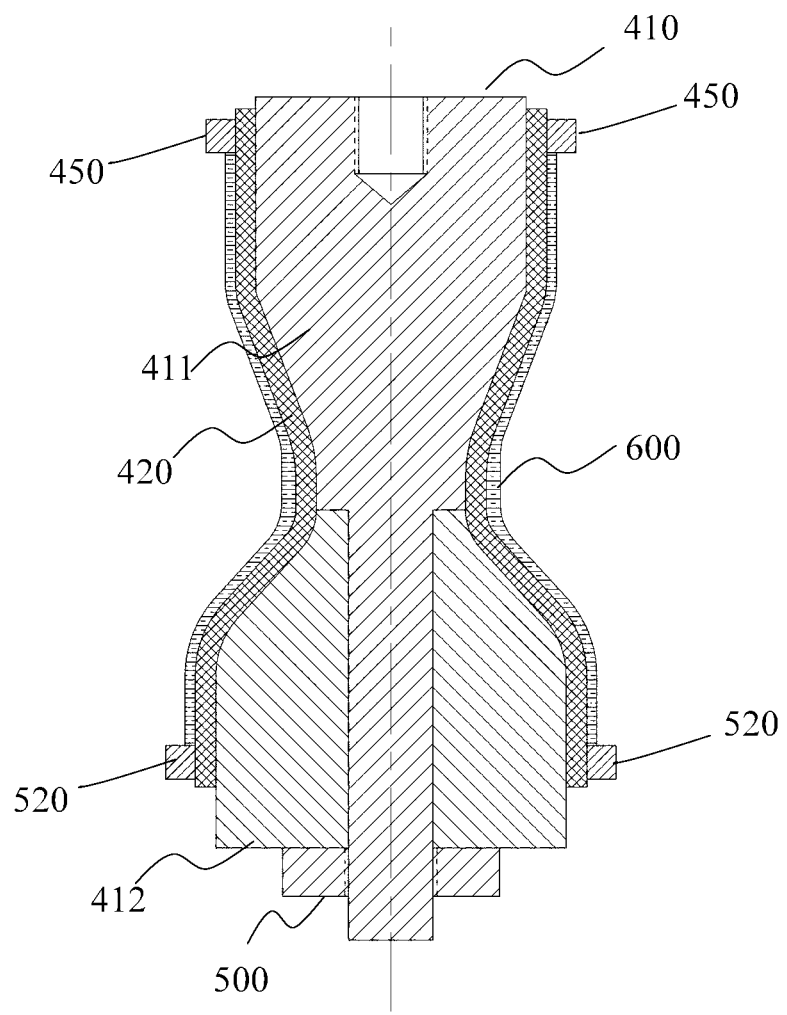
Figure 8:
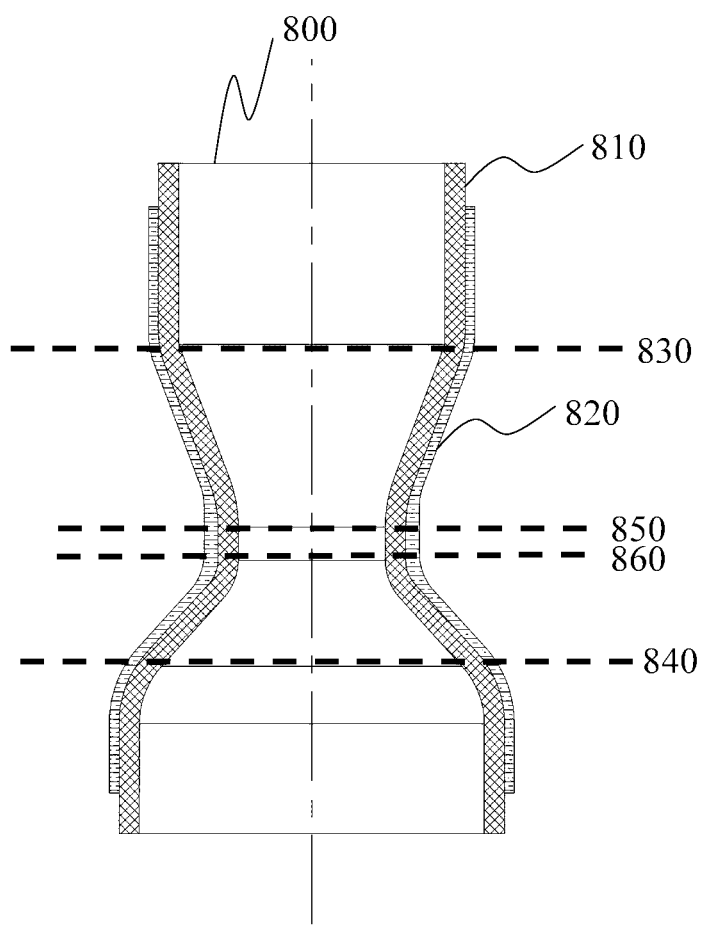
FIG. 8 schematically shows the fourth step (Step 4) of the manufacture method of the present invention.

Referring to FIG. 3, which schematically illustrates cross-section of the 3D braided composite tube of the present invention. Referring to FIGS. 4~8, which schematically illustrates cross-section of the 3D braided composite tube of the present invention. These figures also illustrate the manufacture method of the 3D braided composite tube of the present invention. FIG. 4 shows the first step (Step 1) of the manufacture method. FIG. 5 shows the second step (Step 2) of the manufacture method. FIGS. 6-7 show the third step (Step 3) of the manufacture method. FIG. 8 shows the fourth step (Step 4) of the manufacture method. As shown in FIG. 3, the 3D braided composite tube 300 comprises: a 3D braided inner layer 310, a fiber yarn outer layer 320 wound over the 3D braided inner layer 310, and a throat section 340 located at the middle portion of the 3D braided composite tube 300. The 3D braided composite tube 300 further comprises a convergent section 330 and a divergent section 350. The convergent section 330 allows one side of the 3D braided composite tube 300 to converge toward one side of the throat section 340, and the divergent section 350 allows another side of the throat section 340 to diverge toward another side of the throat section 340.

Figure 1:
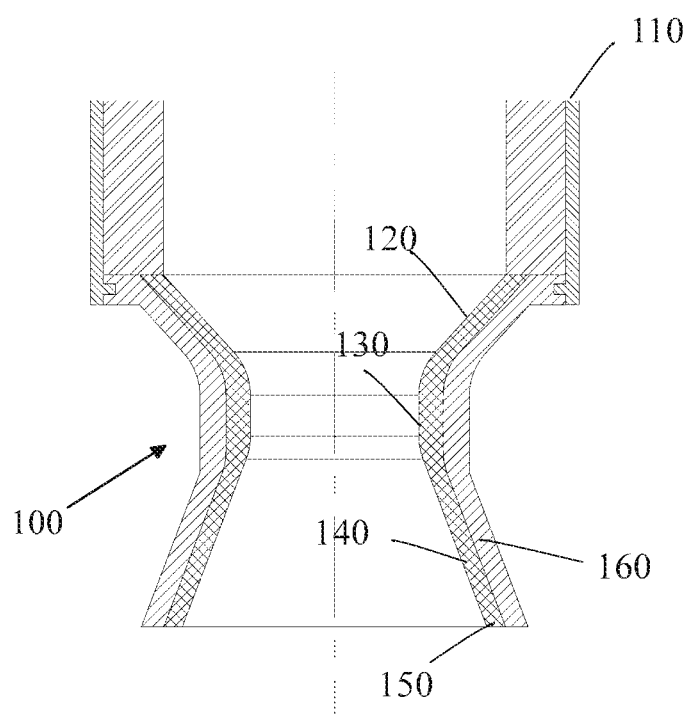
FIG. 1 schematically illustrates cross-section diagram of a conventional rocket nozzle 100.
Figure 2:
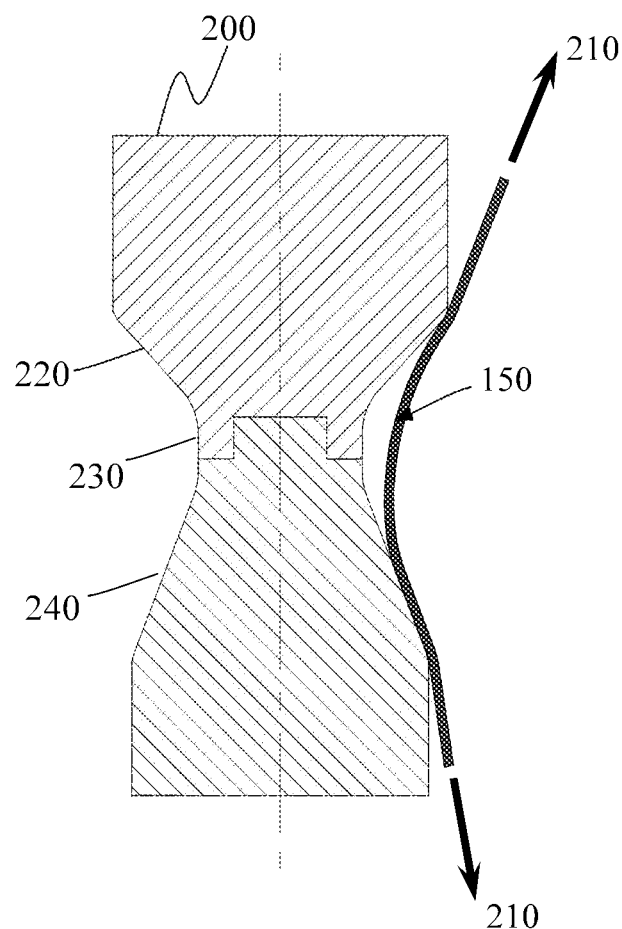
FIG. 2 schematically illustrates that the insulated layer 150 of FIG. 1 is manufactured on a mandrel 200 by a 3D braiding technology, and fiber yarn 210 in the insulated layer 150 fails to contact the mandrel 200 because of tension force 250.

As shown in FIG. 3, wherein the 3D braided composite tube 300 is upside-down to the rocket nozzle 100 of FIG. 1, that is, the convergent section 330 is downward and the divergent section 350 is upward. In the present invention, it starts to braid the fiber yarn from the divergent section because the fiber yarn is relatively easy to attach on the convergent section. The braiding direction of the present invention is from top to bottom on a braiding machine of prior art. The fiber yarn outer layer 320 is wound with tension over the 3D braided inner layer 310 on a filament winding machine of prior art, followed by a resin infiltration process to combine both layers. Thereby, 3D braided inner layer 310 is tightened and forced to contact the mandrel throughout the resin infiltration process.

Referring to FIGS. 4~8, which illustrate the manufacture method of the 3D braided composite tube of the present invention. Note that the braided thickness is changed with the tube radius, and for simplified description in the embodiment, the thickness illustrated in each figure is the same. The steps of the manufacture method is described as follow:

Step 1: providing an assembled mandrel 410 composed of an upper mandrel 411 and a lower mandrel 412, and attaching the upper mandrel 411 to a seat 400 of a braiding machine (not shown) with screw or any adequate way. Subsequently, separating the lower mandrel 412 to a distance from the upper mandrel 411 so that the lower mandrel 412 will not interfere the braiding operation on the upper mandrel 411, then braiding 3D braided inner layer 310 on the upper mandrel 411 until it exceeds the required length of the composite tube. Specifically, in step 1, there is no interference between the upper mandrel 411 and the lower mandrel 412 while braiding the 3D braided inner layer 420, so the 3D braided inner layer 420 can better attach onto the upper mandrel 411 in spite of the effect of the tension force 460. After the 3D braided inner layer 420 is done, binding devices 430, 440 and 450 are respectively tightened to bind the 3D braided inner layer 420 to the upper mandrel 411, as shown in FIG. 4.

Step 2: pushing the lower mandrel 412 upward to combine with the upper mandrel 411, and fixing the lower mandrel 412 to the upper mandrel 411 by a fixing device 500, then tightening the 3D braided inner layer 420 to the lower mandrel 412 by binding devices 510, 520. Specifically, the position of the seat 400 of the braiding machine is adjusted during the tightening process so that tension force 530 working on the 3D braided inner layer 420 is partially released to facilitate the binding process. The tension force 530 is totally released after the 3D braided inner layer 420 is tightened, and the assembled mandrel 410 with the 3D braided inner layer 420 is removed from the seat 400, as shown in FIG. 5. Subsequently, the assembled mandrel 410 with the 3D braided inner layer 420 is mounted in a winding equipment (not shown), for example, a filament winding machine for fabricating pressure vessels. Any kind of winding equipment and the like can be used.

Step 3: removing the middle binding device 430 and winding fiber yarns from middle portion of the assembled mandrel 400 toward two ends to the end binding devices respectively (for example, binding devices 440, 510) so as to form fiber yarn outer layer 600 over the 3D braided inner layer 420, as shown in FIG. 6. Specifically, an appropriate tension force is applied on the fiber yarn during winding to force the 3D braided inner layer 420 tightly contact with the assembled mandrel 410. The binding devices 440, 510 are selectively removed as required to continue the winding process as shown in FIG. 7.

Step 4: put the assembled mandrel 410 with the 3D braided inner layer 420 and the fiber yarn outer layer 600 into a pressure vessel (not shown) containing resin, which is selected from a group consisting of epoxy resin, phenolic resin and furan resin, then close and seal the pressure vessel and apply pressure into the sealed pressure vessel to force the resin to infiltrate into the 3D braided inner layer 420 and the fiber yarn outer layer 600. Meanwhile, the temperature is increased to converting the resin to B-stage. Subsequently, the mandrel 410 with the 3D braided inner layer 420 and the fiber yarn outer layer 600 is put into a vacuum bag (not shown) and moved to an autoclave to cure the B-staged perform to a composite part. After the curing process, the fixed device 500 is removed and the upper mandrel 411 and the lower mandrel 412 are disassembled from two ends of the composite part 800, which is a 3D braided composite tube with a narrower throat section, as shown in FIG. 8. The composite tube 800 is optionally put in an oxygen-free environment and the temperature is gradually increase to 800~900° C. to carbonize the matrix. The densification process of infiltrating, curing and carbonization is repeated until the desired density of the composite is achieved. Thereafter, the temperature is optionally increased to 2600° C. to transfer the carbon matrix to graphite to further improve the ablation ability. Moreover, the composite tube 800 comprising a 3D braided inner layer 810 and a fiber yarn outer layer 820 can be cut to obtain a required cut section, which is used as the rocket nozzle, for example, the required cut section between the dashed lines 830 and 840 is equivalent with the 3D braided composite tube 300 of FIG. 3 and for another condition dividing the composite tube 800 into two parts necessarily by cutting between the dashed lines 850 and 860 while combining a shell and an insulating layer.

When the 3D braided composite tube 300 of the present invention, which comprises a 3D braided inner layer 310 and a fiber yarn outer layer 320, is used in a rocket nozzle as ablative, the ablation rate is decreased so the thrust of the motor can be maintained. Moreover, the hoop strength of the throat section is increased thanks to the fiber yarn outer layer 320 so that the metal shell can be made thinner to reduce the weight of the rocket nozzle.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A manufacture method of three dimensional (3D) braided composite tube with a throat section, comprising:
providing an assembled mandrel comprising an upper mandrel and a lower mandrel, wherein the assembled mandrel has a middle portion which is narrower than two ends of the tube,
separating the lower mandrel from the upper mandrel and braiding an 3D braided inner layer on the upper mandrel, then tightening the 3D braided inner layer to the upper mandrel by binding devices;
combining the lower mandrel with the upper mandrel, and fixing the lower mandrel to the upper mandrel by a fixing device, then tightening the 3D braided inner layer to the lower mandrel by another set of binding devices;

removing the binding devices at the middle portion of the assembled mandrel, followed by winding fiber yarns from the middle portion of the assembled mandrel toward two ends thereof to the end binding devices respectively to form a fiber yarn outer layer over the 3D braided inner layer; and infiltrating resin into the 3D braided inner layer and the fiber yarn outer layer, and increasing temperature to cure the resin to obtain a composite tube.

2. The manufacture method of claim 1, wherein one terminal of the throat section is coupled to a converge section, and another terminal of the throat section is coupled to a diverge section.

3. The manufacture method of claim 1, wherein the resin is selected from a group comprising epoxy resin, phenolic resin and furan resin.

4. The manufacture method of claim 1, wherein the method of infiltrating resin into the 3D braided inner layer and the fiber yarn outer layer is a resin transfer molding process.

5. The manufacture method of claim 1, wherein the method of infiltrating resin into the 3D braided inner layer and the fiber yarn outer layer is a vacuum-assisted resin transfer molding process.

* * * * *